United States Patent [19]
Del Pico et al.

[11] 3,956,114
[45] May 11, 1976

[54] PROCESS FOR THE CONCENTRATION OF POLYVINYL-CHLORIDE EMULSION

[75] Inventors: Joseph Del Pico, Brockton; Shmuel Sternberg, Waltham, both of Mass.

[73] Assignee: Abcor, Inc., Cambridge, Mass.

[22] Filed: Aug. 31, 1973

[21] Appl. No.: 393,398

[52] U.S. Cl. .............................. 210/23 F; 210/23 H
[51] Int. Cl.² .......................................... B01D 13/00
[58] Field of Search ................. 210/23, 321, 500 M; 204/180 P

[56] References Cited
UNITED STATES PATENTS

| | | | |
|---|---|---|---|
| 3,132,094 | 5/1964 | McKelvey, Jr. et al. | 210/23 |
| 3,554,266 | 1/1971 | Baird et al. | 159/49 |
| 3,663,403 | 5/1972 | Christenson et al. | 204/180 P |

FOREIGN PATENTS OR APPLICATIONS

| | | | |
|---|---|---|---|
| 172,012 | 2/1923 | United Kingdom | 210/500 M |

Primary Examiner—Frank A. Spear, Jr.
Attorney, Agent, or Firm—Richard P. Crowley

[57] ABSTRACT

A process of concentrating an aqueous polyvinyl-chloride emulsion employing a membrane device comprising a feed zone and a permeate zone, the zones separated by an ultrafiltration semipermeable membrane, which process comprises: introducing the polyvinyl-chloride emulsion to be concentrated into the feed zone; removing a concentrated polyvinyl-chloride emulsion from the feed zone and removing an aqueous fraction from the permeate zone; interrupting the process of concentration periodically when the flux rate of the process falls below a desired flux rate value; and contacting the semipermeable membrane with a solution containing a solvent, such as tetrahydrofurane, for the polyvinyl-chloride for a time sufficient to restore the flux value to its desired level, the semipermeable membrane employed characterized by being solvent-resistant to the solvent employed in contacting the membrane.

19 Claims, 1 Drawing Figure

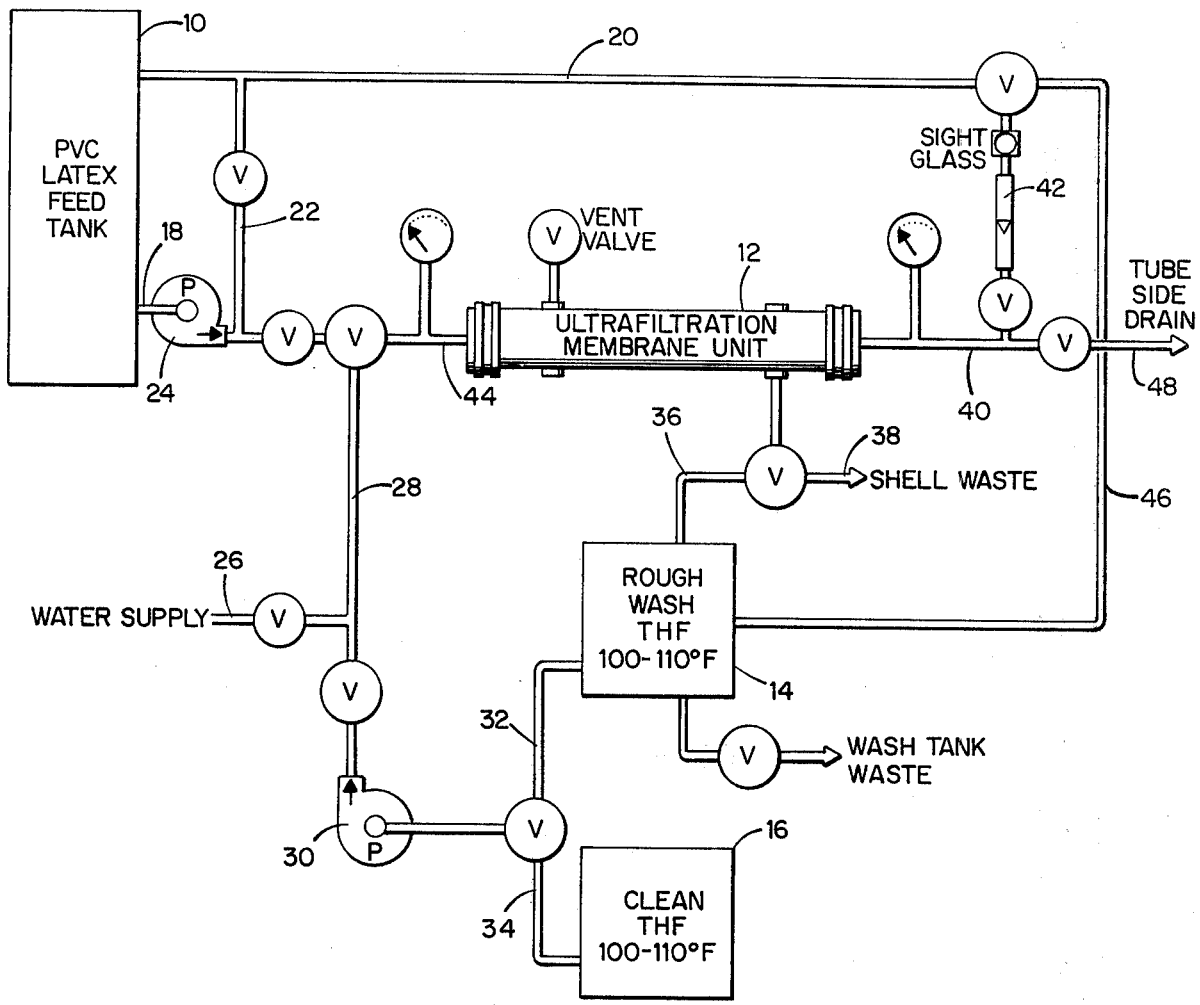

PROCESS FOR THE CONCENTRATION OF POLYVINYL-CHLORIDE EMULSION

BACKGROUND OF THE INVENTION

Ultrafiltration devices employing semipermeable membranes have been employed to separate aqueous solutions containing long-chain or polymeric components, such as the concentration of whey solutions and the concentration of paint from aqueous electro-coating paint compositions. Such ultrafiltration devices provide an aqueous-permeate fraction, while the high molecular weight or larger size molecular components of the solution are retained by the membrane and removed from the feed zone in a concentrated form. Ultrafiltration devices typically operate at pressures ranging from about 20 to 250 psig as distinct from reverse osmosis devices which operate at substantially higher pressures and require a different or much tighter membrane structure.

Typical membranes employed in such devices would comprise filament-wound or braided, glass-fiber, resin-reinforced tubes with a cellulose-acetate semipermeable membrane inserted or cast onto the interior surface of the tube support. Such supported membrane tubes rapidly diminish in flux rate with use when employed in an attempt to concentrate by ultrafiltration techniques, polyvinyl-chloride latex emulsions. It has been found, for example, that such regular supported membrane tubes lose their flux value irreversibly during the attempted concentration by ultrafiltration of polyvinyl-chloride latex. The reason for this loss of flux has not been conclusively determined, but it is believed to be associated with the fouling of the membrane by components of the polymer of the latex to be separated or concentrated. In the use of ultrafiltration devices for the separation of whey solutions in the dairy industry, the flux value of the membrane can often be somewhat restored by periodically cleaning the surface of the membrane with an aqueous detergent composition, which cleaning extends the useful life of the membrane, but typically never restores the flux to its prior or virgin value.

SUMMARY OF THE INVENTION

Our invention is directed to a process for restoring or increasing the flux rate of a semipermeable membrane, particularly when employed in an ultrafiltration process. More particularly, our invention is directed to a process and apparatus system for concentrating polyvinyl-chloride or other polymeric latex or emulsion compositions or other compositions, the components of which tend to foul the membrane during use, such as wherein the flux value of the semipermeable membrane employed is periodically increased during use by contacting the semipermeable membrane with a solvent for the polyvinyl-chloride or other polymer, and wherein the semipermeable membrane employed is solvent-resistant to the solvent so employed. Our invention also concerns supported ultrafiltration membranes employed in our process.

Our invention is directed to a process for concentrating and/or separating a polymer-containing composition employing ultrafiltration semipermeable membrane techniques, such as, for example, the concentrating of polyvinyl-chloride latex. In our process, an ultrafiltration device is employed which contains a semipermeable membrane of the desired characteristics hereinafter set forth, which membrane separates the device into a feed zone and a permeate zone, such as, for example, the employment of filament-wound or braided, glass-fiber, resin-reinforced tubes wherein a semipermeable membrane is cast or inserted into the interior of the tube, and wherein a polymer composition is introduced into the interior of the tube at the one end and a concentrated polymer solution removed from the other end, while a fraction, such as an aqueous fraction, where the polymer solution is an aqueous polymer solution, is removed from the permeate zone.

Our process comprises interrupting the process of separation or concentration periodically or when the flux rate or other desired values falls below a desired flux rate or other values during the process of separation or concentration. In our process, the semipermeable membrane is contacted with a solvent for the polymer which is being concentrated or separated for a time period under temperature and other process conditions sufficient to remove or dissolve, wholly or partially, any polymeric material blocking the membrane pores, and to restore or to increase the flux toward its prior or original value. It is critical that the semipermeable membrane employed in our process be characterized by being composed of a solvent-resistant material to the particular solvent and conditions employed in contacting the semipermeable membrane.

In our preferred embodiment, we have found that polyvinyl-chloride emulsions of about 30 to 35% solids content may be concentrated to higher values, such as, for example, over 40% or over 50%, such as 40 to 70% solids. Typically, such aqueous polyvinyl-chloride emulsions or latices include the polyvinyl-chloride polymer, a free surfactant and an antifoaming agent. Attempts to separate or concentrate the polyvinyl-chloride emulsion employing a cast cellulose-acetate membrane in a braided resin-reinforced tubular support result in irreversible fouling during use of the membrane, so that the flux value is rapidly diminished to an unsatisfactory level; for example, below 10 gallons per day per square foot. Attempts to restore or increase the flux value by acceptable washing of the interior surface of the membrane tubes with a detergent solution have also been unsuccessful.

For the purposes of illustration only, our invention will be described in connection with the process of concentrating a polyvinyl-chloride emulsion latex composition through employing an ultrafiltration membrane composed of a material which is solvent-resistant to tetrahydrofurane. The semipermeable membrane may be composed of a variety of synthetic or natural polymeric materials which are capable of permitting the desired ultrafiltration process to be conducted, provided, however, that the semipermeable membrane must have the characteristic of being solvent-resistant to the solvent which is employed in contacting; that is, washing, the membrane surface periodically during the process. The term "solvent-resistant" is used in the sense that the semipermeable membrane material should not degrade during the washing process, so as to affect significantly its characteristics as a semipermeable membrane. It is recognized that membrane materials may, on exposure to the solvent, tend to swell slightly during the washing step which is permissible, provided that the membrane may be restored, such as, for example, after washing with water or other liquid material, to its function as a semipermeable membrane.

In our preferred embodiment, a semipermeable membrane composed of a copolymer of nitrile-acrylic monomers is employed, the material cast from a solvent solution as a thin film onto the interior surface of a glass-fiber, braided, resin-reinforced permeable support tube. A preferred material having a solvent resistance to tetrahydrofurane is a copolymer of an acrylic-nitrile thermoplastic material which dissolves at 73°F in dimethyl formamide and acetyl nitrile, but which is solvent-resistant to normal hexane, carbon tetrachloride, kerosene, toluene, trichloroethylene benzene, ethyl alcohol, ethyl acetate, and similar liquid solvents.

The semipermeable membrane material should be solvent-resistant over the range of temperatures in which the ultrafiltration process is carried out, typically from 70° to 160°F; for example, 70° to 100°F. Particularly suitable for employment as a semipermeable membrane in our process are those synthetic polymeric materials which may be cast as semipermeable membranes, and which are temperature-resistant and solvent-resistant. Other membrane materials which may be suitable for use include, but are not limited to, depending upon the process: polyamides, such as nylon and aromatic polyamides, polyphenylene oxides; olefinic resins, such as polypropylene, and the like, such as cross-linked polymers. Such semipermeabble membrane materials selected should be capable of being prepared as semipermeable membranes, such as being dissolved in suitable solvents so that they may be cast as a thin layer onto a suitable support material. Copolymers and terpolymers would also include those polymeric materials, such as prepared by polymerizing, acrylonitrile, methacrylonitrile and other ethylenically unsaturated dienes like isoprene and butadiene, and various acrylates, such as acrylates and methacrylates and other acrylic resins like the esters of acrylic and methacrylic acids, such as methyl, ethyl, isopropyl and hexyl acrylates and methacrylates.

The solvent solutions employed in contacting semipermeable membranes may vary, depending upon the particular polymeric material being concentrated or separated in the ultrafiltration process. Such solvents would include, but not be limited to, hydrocarbons, such as xylene, toluene, kerosene, hexane, benzene and the like; or halohydrocarbons, such as carbon tetrachloride, trichloroethylene and the like; ketones, like acetones, methylethyl ketones; furnaces, such as tetrahydrofurane; alcohols, such as ethyl and methyl isopropyl alcohol; as well as dimethyl formamide; acetyl nitrile, alone or in combinations thereof in solutions with diluents and nonsolvents.

Although our process and apparatus scheme is directed in particular to the concentration of polyvinyl-chloride emulsions, our invention may be usefully employed with a wide variety of liquid compositions, polymeric and monomeric, solutions, suspensions, liquid-liquid or solid-liquid emulsions, latices, slurries and the like wherein one or more of the components in the composition tends to foul the membrane during use, and which component may be dissolved, degraded or removed by the use of a solvent which does not affect the selected membrane.

Other emulsion or latex compositions include, but are not limited to, copolymers of vinyl chloride with short-chain fatty acids, elastomeric latices, such as ethylene-propylene copolymers, butadiene-styrene copolymers, acrylonitrile-butadiene-styrene copolymers, acrylic emulsions, polyvinyl acetate emulsions and other polymeric emulsions or latex compositions where it is desired to concentrate the composition to a higher concentration value.

BRIEF DESCRIPTION OF THE DRAWING

The drawing is a schematic illustration of a process for and apparatus of the invention to concentrate a polyvinyl-chloride emulsion composition.

DESCRIPTION OF THE EMBODIMENTS

A semipermeable membrane casting composition was prepared by dissolving from 18 to 24% by weight of a thermoplastic terpolymer composed of about 70% acrylonitrile, 15% butadiene and 15% ethyl acrylate in a solvent composed of equal parts of dimethyl formamide and N-methyl pyrrolidone. An epoxy resin-reinforced permeable braided glass-fiber support tube was then prewetted in the interior with a liquid to wet the interior surface of the fiber-glass tube, such as, for example, with triethyl phosphate. The tube was then arranged vertically and the casting solution cast vertically onto the interior surface of the tube through the use of the casting bob. The pretreating liquid is a solvent compatible with the solvent of the particular casting solution to be employed and is water-miscible, but should not be a solvent for the semipermeable membrane material. Immediately after casting, such as, for example, 5 to 60 seconds thereafter, water was run into the interior of the tube to leach out the solvent at room temperatures of from about 20°–30°C, and, thereafter, the tube was immersed in a water bath at the same temperature prior to use in an ultrafiltration device. Membrane tubes are prepared at a membrane pore size ranging from about 50 to 100 Angstroms.

Membrane tubes so prepared were installed in an ultrafiltration membrane device, and a commercial aqueous polyvinyl-chloride emulsion latex of about 30% solids was introduced into the interior of the tubes. In one test, for tubular membranes so prepared were tested for periods of 3 to 5 hours. The flux rates were measured approximately every half hour, and samples for percent solids determination were withdrawn at predetermined intervals. Before and after every run, pure water fluxes were measured to determine the extent of membrane fouling in recovery. This procedure was repeated every day for a week. The process of concentration was interrupted periodically when the flux value reached a level of about 20 gfd, and the interior of the membrane was then washed with tetrahydrofurane at varying periods of time from about 20 minutes to 3 hours at temperatures of 80 to 100°F. Even the shortest wash cycle of 20 minutes at 100°F and 10 additional minutes with fresh 100°F tetrahydrofurane was sufficient to permit the recovery of the flux value.

Examination of the membrane tubes after such wash cycle showed no or little accumulation of polyvinyl-chloride polymers in the membrane pores. The flux value versus latex concentration as shown in Table I had two different flow rates. The data is composite data of four tubes over a week of testing. The lack of any marked departures or trends indicated that the supported membranes returned to their substantial original flux state every day. Some of the data collected was for virgin membranes and other for membranes washed as many as four times, with no evidence of membrane deterioration. Some of the ehtylene-propylene rubber sealing gaskets swelled in contact with the tetrahydrofurane, but returned to normal when immersed in water.

Initially, the water flux of the membrane, unwashed as well as washed, was high, 300 to 500 gfd, but dropped rapidly to 100 gfd, probably due to membrane compaction in use, the water flux being at 50 psi at 8° to 12°C.

The results clearly indicated that the supported semipermeable membrane may be used to concentrate polyvinyl-chloride latex emulsions, and on deterioration of the flux by the polyvinyl-chloride polymer, the semipermeable membrane may be regenerated up

TABLE I

| Test Conditions: | 30 GPM 50 PSI IN 38 PSI OUT TEMP: 23-33°C | Test Conditions: | 40 GPM 50 PSI IN 35 PSI OUT TEMP: 24-26°C |
|---|---|---|---|
| % Solids | Flux, GFD | % Solids | Flux, GFD |
| 33.3 | 15.7 | 39.7 | 20 |
| 39.0 | 14.0 | 42.5 | 17.6 |
| 49.7 | 10.3 | 45.0 | 16.0 |
|  |  | 46.9 | 14.7 |
|  |  | 49.0 | 13.2 | or to its original flux value by short-period washings of the semipermeable membrane with tetrahydrofurane solvent; that is, a solvent wich is an excellent solvent for the polyvinyl-chloride polymer. Tetrahydrofurane or its azeotrope; that is, 96% tetrahydrofurane with water, may be employed, preferably at a temperature range from 100° to 120°F.

In the ultrafiltration concentration process, we have found that the process is dependent upon temperature and flow, with little dependence on pressure. The preferred process conditions for the concentration of polyvinyl-chloride latex emulsion would be from about 70° to 90°F at a flow rate of 25 to 50 gallons per minute, with the pressure being over 20 psi, preferably 20 to 200 psi, and more preferably 30 to 60 psi, with the latex concentration employing from about 30 to 33% to 50 to 55% solids. The tetrahydrofurane or other wash solvent may be reused, and where it becomes contaminated with water, or of diminished solvent efficiency, it may be recovered through conventional techniques, such as distillation of the tetrahydrofurane wash solvent, and the polymer and solvent may be recovered if desired using the technique as set forth in U.S. Pat. No. 3,554,266, issued Jan. 12, 1971, hereby incorporated by reference.

The drawing shows a schematic illustration which comprises a polyvinyl-chloride latex holding or storage tank 10, and an ultrafiltration membrane unit 12 which includes a plurality of supported tubular membranes (not shown), such as those prepared in the preceeding example, the membrane tubes arranged in a modular fashion within the membrane shell, the interior of the tubes representing the feed zone and the exterior of the tubes within the shell representing the permeate zone. A first rough wash tetrahydrofurane tank 14, together with a second or final clean tetrahydrofurane wash tank 16 as shown, are connected by conduits 32 and 34.

In operation, the process is carried out by stirring the polyvinyl-chloride latex in the holding tank 10 by circulating the latex through pipe 18, pump 24, pipe 22 back to the top of the latex feed tank. The polyvinyl-chloride latex is then concentrated by introducing the latex through pipe 18, pump 24 into the inlet to the ultrafiltration membrane unit 12, and the concentrated polyvinyl-chloride latex removed through pipe 40 and pipes 42 and 20 back to the feed tank 10, while the aqueous permeate fraction composed primarily of water is removed as shell waste through pipe 38.

Periodically, such as once every 5 days or 10 days or as required, or when the flux value of the membrane falls over the desired value, the membrane is contacted with tetrahydrofurane. In operation, a first rough tetrahydrofurane or solvent wash is carried out, followed by a final brief tetrahydrofurane fresh solvent or other solvent wash. Optionally, one or more number of solvent washes can be effected if desired; however, it is desirable to follow a rough wash wherein the tetrahydrofurane comes into contact with water in the shell and forms an azeotrope (about 97% THF) with a final brief pure or fresh tetrahydrofurane or solvent wash in order to remove any residual water which might remain after the first wash.

The solvent washing cycle is carried out through draining the aqueous permeate fraction; that is, the water, from the interior of the shell from the membrane unit 12 through pipe 38. Tetrahydrofurane is then introduced from the rough wash tank 14 through pipe 32, pump 30, pipes 28 and 44 into the interior of the supported tubular membrane, and removed through pipe 40 to pipe 42 through sighting of the tetrahydrofurane in the sight glass, at which time the tetrahydrofurane is recycled through pipe 46 back into the rough wash tank 14. After repeated reuse of the rough wash tetrahydrofurane solution, the wash tank waste may be removed from the wash tank 14 as shown. After the rough wash, one or more brief final tetrahydrofurane final wash cycle is commenced wherein clean tetrahydrofurane is introduced from the final clean THF tank 16 through conduit 34, pump 30, pipes 28 and 44 into the interior of the membrane unit 12 through pipe 42, and hence through the pipe 40 and pipe 46 wherein the tetrahydrofurane so used is then returned, not to the clean tetrahydrofurane tank, but to the rough wash tank 14. The temperatures of the particular solvent, the wash times, number of cycles and sequence thereof may be varied, and depends upon the requirements of the process and the flux values desired.

After the final brief tetrahydrofurane wash, the membrane unit 12 is water-flushed prior to commencing the next batch of polyvinyl-chloride concentration; that is, a repeating of the prior cycle, by introducing water through pipe 26, pipe 28, pipe 44 into the inlet of the unit 12, removing the water through pipe 40 and to drain pipe 48. Polyvinyl-chloride in pure tetrahydrofurane forms a true solution; however, polyvinyl chloride has a tendency to precipitate out as the water concentration increases in tetrahydrofurane. We have found that the flux rate of the membrane employing the polymeric membrane described falls gradually, so that in four to five days, there is only little loss of flux, and, consequently, washing of the membrane is recommended at least once a week or every five to ten days to maintain flux. Typically, the tetrahydrofurane wash is carried out at about 90° to 110°F under pressures of 5 to 10 psig for periods of time ranging from, for a rough wash, 30 minutes to 2 hours, and for the second final wash, from about 1 minute to 1 hour under similar temperature and pressure conditions as illustrated. It is desirable to remove completely the tetrahydrofurane from the system prior to concentrating again the polyvinyl chloride emulsion, since, if tetrahydrofurane containing polyvinyl chloride remains in the system, for instance, in the membrane pores, then on contacting with water or the emulsion, the polyvinyl-chloride so dissolved will precipitate out consequently, it is important with a polyvinyl-chloride process to use a solvent which not only dissolves the polyvinyl-chloride, but which is also water-soluble or water-miscible, so that the solvent containing the dissolved polyvinyl-chloride or other polymer may be removed by a water wash prior to introducing the concentration process.

What is claimed is:

1. In a process for concentrating or separating an aqueous polymer-containing emulsion in an ultrafiltration semipermeable membrane device comprising a feed zone and a permeate zone, the zones separated by a semipermeable membrane adapted to prevent the passage of the polymer through the semipermeable membrane to provide a permeate-rich solvent fraction and a polymer-rich fraction, the process comprising: introducing the polymer emulsion into the feed zone; removing a permeate-rich solvent fraction from the permeate zone; removing a polymer-rich fraction from the feed zone, the improvement which comprises:
   a. interrupting the process periodically or when the flux rate through the semipermeable membrane falls below a desired flux rate value; and
   b. contacting the semipermeable membrane with a nonaqueous solvent for the polymer which is being concentrated or separated for a time sufficient to restore the flux value of the semipermeable membrane in the process to its desired value, the semipermeable membrane material characterized by being solvent-resistant to the solvent employed in contacting the membrane.

2. The process of claim 1 wherein the polymer composition comprises a vinyl-chloride polymer latex emulsion emulsion, and wherein the solvent is tetrahydrofurane.

3. The process of claim 1 wherein the semipermeable membrane comprises an acrylic-nitrile polymer, a polyphenylene oxide polymer or a polyamide.

4. The process of claim 1 wherein the steps of interrupting and contacting occur when the water flux rate of the membrane falls below 20 gpd.

5. The process of claim 1 which includes employing a wash solvent which is water-miscible, and after contacting the membrane with the solvent, contacting the membrane with water to remove solvent from the membrane prior to commencing the process.

6. The process of claim 1 wherein the semipermeable membrane is a cast membrane on the interior of a braided, resin-reinforced, tubular support, and wherein the semipermeable membrane comprises an acrylonitrile-butadiene-ethylacrylate terpolymer.

7. The process of claim 1 wherein the semipermeable membrane is solvent-resistant to the solvent employed in the contacting step over the temperature range of from about 70° to 160°F.

8. The process of claim 1 wherein the solvent for the polymer is selected from the group consisting of tetrahydrofurane, dimethylformamide, xylene, toluene, hexane, acetone, methylethyl ketone, acetyl nitrile and combinations thereof.

9. The process of claim 1 wherein the polymer-containing emulsion is selected from the group of polymers consisting of vinyl-chloride polymers, butadiene-styrene copolymers, acrylic polymers, polyvinyl acetate, and ethylene-propylene copolymers.

10. The process of claim 1 wherein the solvent employed to restore the flux value of the semipermeable membrane is tetrahydrofurane, and which solvent is thereafter recovered by distillation.

11. The process of claim 1 wherein the semipermeable membrane is cast onto the interior of a porous tubular support, and wherein a water-miscible solvent for the polymer of the emulsion is periodically passed from the one to the other end through the interior of the porous support tubes to restore the flux value of the semipermeable membrane.

12. The process of claim 1 wherein the solvent is placed in contact with the semipermeable membrane by the introduction of a solvent into and withdrawal from the feed zone of the semipermeable membrane device.

13. A process for concentrating an aqueous vinyl-chloride polymeric emulsion composition employing an ultrafiltration membrane device composed of a feed zone and a permeate zone separated by a semipermeable membrane adapted to retain the vinyl-chloride polymer, and to permit the passage of water, which process comprises:
   a. introducing the emulsion into the feed zone of the semipermeable ultrafiltration membrane device;
   b. removing a concentrated polyvinyl-chloride latex emulsion containing from about 35 to 60% by weight of a polyvinyl-chloride polymer from the feed zone and removing an aqueous fraction from the permeate zone;
   c. interrupting the process of concentration periodically and washing the semipermeable membrane with tetrahydrofurane to dissolve the vinyl-chloride polymer, the semipermeable membrane characterized by being composed of a material which is solvent-resistant to tetrahydrofurane; and, thereafter,
   d. washing the semipermeable membrane with water to remove the tetrahydrofurane solvent prior to recommencing the process of concentration, thereby permitting the concentration of polyvinyl-chloride emulsion latices to a high solids level in an ultrafiltration device in an efficient and economic manner.

14. The process of claim 13 which includes employing as the solvent a 100% tetrahydrofurane solvent, and wherein, after washing the semipermeable membrane, another tetrahydrofurane solvent is used to wash the semipermeable membrane prior to washing the semipermeable membrane to remove the tetrahydrofurane with water.

15. The process of claim 13 wherein the tetrahydrofurane solvent comprises a tetrahydrofurane-water azeotrope solution.

16. The process of claim 13 wherein the semipermeable membrane is washed with the tetrahydrofurane for a period of time from about 10 minutes to 1 hour at a temperature from about 80° to 100°F.

17. The process of claim 13 wherein the semipermeable membrane is composed of a terpolymer of acrylonitrile-butadiene-acrylate which has been cast onto the interior of a braided resin-reinforced tubular support.

18. The process of claim 13 wherein the period of interruption occurs at least once during each 7-day period of use of the process.

19. The process of claim 13 wherein the ultrafiltration separation is carried out at a temperature of approximately 70° to 90°F at a flow rate of 25 to 50 gpm at a pressure of from about 20 to 200 psi.

* * * * *